US008237822B2

United States Patent
Chang et al.

(10) Patent No.: US 8,237,822 B2
(45) Date of Patent: Aug. 7, 2012

(54) IMAGE PROCESSING METHOD AND APPARATUS FOR REDUCING NOISE IN AN IMAGE

(75) Inventors: Soon-keun Chang, Suwon-si (KR); Jin-pyo Gwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 442 days.

(21) Appl. No.: 12/622,659

(22) Filed: Nov. 20, 2009

(65) Prior Publication Data

US 2010/0128147 A1     May 27, 2010

(30) Foreign Application Priority Data

Nov. 21, 2008    (KR) .................. 10-2008-0116371

(51) Int. Cl.
*H04N 5/217* (2011.01)
*H04N 5/208* (2006.01)
*G06K 9/40* (2006.01)

(52) U.S. Cl. ........ 348/241; 348/252; 382/254; 382/263; 382/264; 382/266

(58) Field of Classification Search ............ 348/207.99, 348/221.1, 241, 242, 243, 244, 245, 246, 348/247, 248, 249, 250, 251, 252, 255, 333.12; 382/254, 260, 261, 262, 263, 264, 265, 266, 382/274, 275
See application file for complete search history.

(56) References Cited

U.S. PATENT DOCUMENTS

| 7,085,428 | B2 * | 8/2006 | Makino ............... 382/266 |
| 7,840,089 | B2 * | 11/2010 | Ho ................... 382/266 |
| 2008/0122953 | A1 * | 5/2008 | Wakahara et al. ....... 348/241 |
| 2008/0175511 | A1 * | 7/2008 | Horie ................. 382/260 |
| 2010/0166333 | A1 * | 7/2010 | Shin .................. 382/260 |

* cited by examiner

*Primary Examiner* — David Ometz
*Assistant Examiner* — Peter Chon
(74) *Attorney, Agent, or Firm* — Drinker Biddle & Reath LLP

(57) ABSTRACT

An image processing method and apparatus may effectively reduce noise in an image which represents an object photographed by a photographing apparatus. The method may include extracting a first low-frequency component and a first high-frequency component from first image data, and applying a noise reduction filter to the first low-frequency component and to the first high-frequency component to obtain a second low-frequency component and a second high-frequency component, respectively. The method may also include obtaining edge data from the second low-frequency component, and amplifying a portion of the second high-frequency component that corresponds to the edge data to obtain a third high-frequency component. The method may further include combining the second low-frequency component with the third high-frequency component to obtain second image data, and controlling the second image data representing the photographed object to be output to at least one of a storage medium and a display unit.

20 Claims, 8 Drawing Sheets

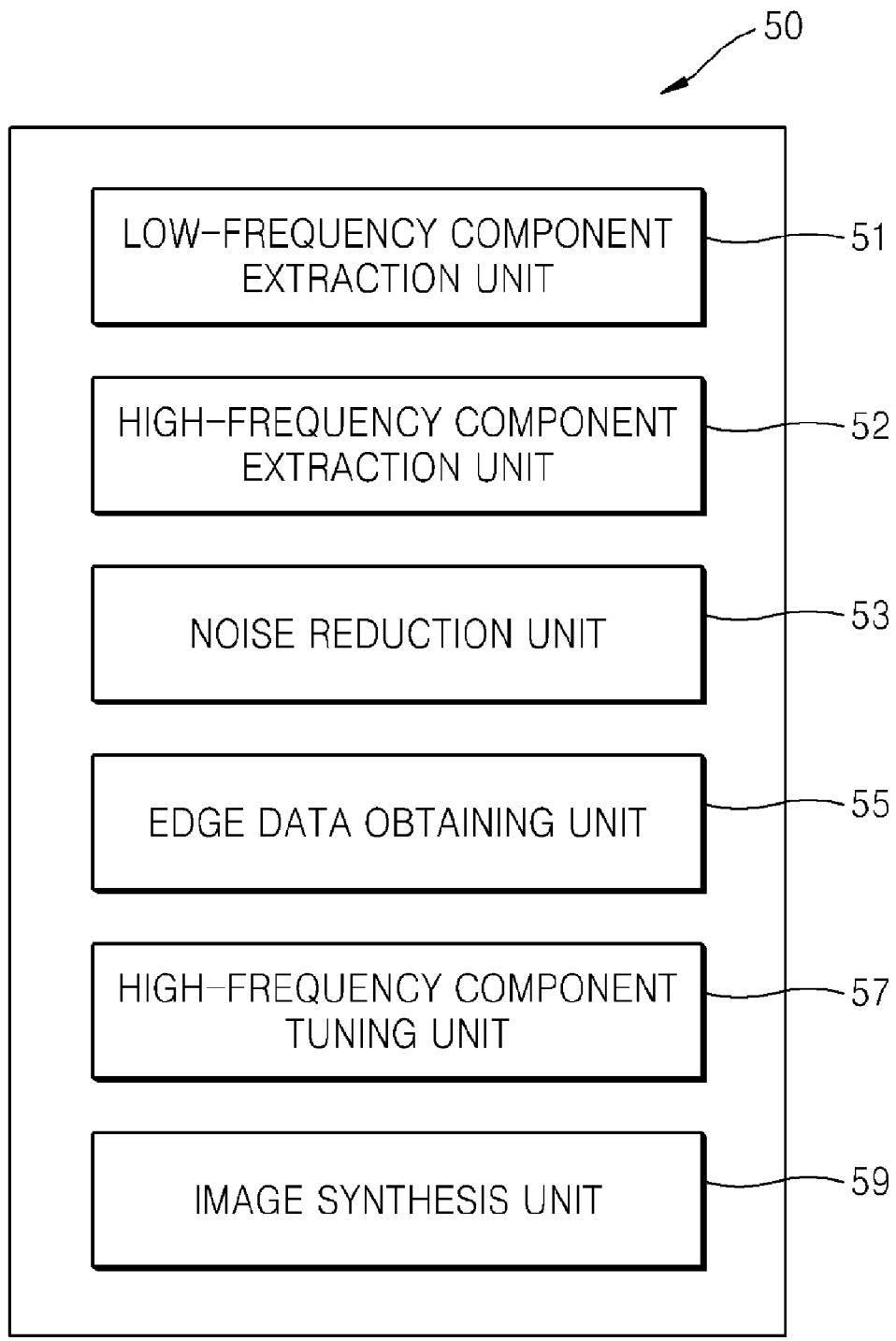

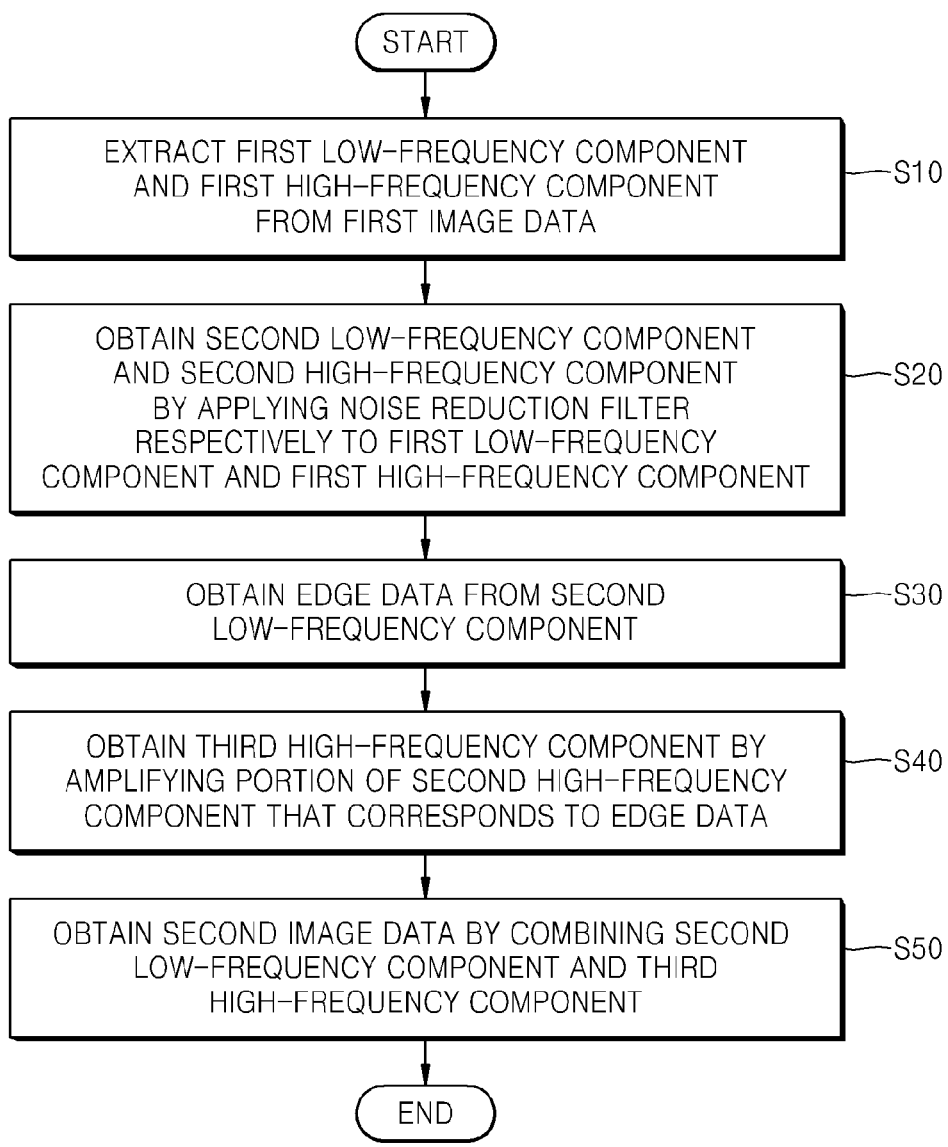

IMAGE PROCESSING METHOD AND APPARATUS FOR REDUCING NOISE IN AN IMAGE

CROSS-REFERENCE TO RELATED PATENT APPLICATION

This application claims the priority benefit of Korean Patent Application No. 10-2008-0116371, filed on Nov. 21, 2008, in the Korean Intellectual Property Office, the disclosure of which is incorporated herein in its entirety by reference.

BACKGROUND

1. Field of the Invention

The present invention relates to an image processing method and apparatus, and more particularly, to an image processing method and apparatus capable of effectively reducing noise in an image.

2. Description of the Related Art

In general, a typical image processing apparatus displays an image from image data on a display unit by reproducing an image file stored in a storage medium. A digital photographing apparatus, which is a type of image processing apparatus, typically photographs a subject in a shooting mode, stores image data regarding the subject in a storage medium, reproduces an image file from the storage medium, and then displays an image from the image data on a display unit.

If image data stored in an image file in the storage medium contains noise data, the noise is typically also displayed on the display unit when such an image processing apparatus displays an image from the image data by reproducing the image file, thereby degrading the quality of the displayed image.

SUMMARY

The present invention provides an image processing method and apparatus for effectively reducing noise in an image, and a computer-readable storage medium having stored thereon a program executable by a processor for performing the method. Embodiments of the present invention may process image data and/or display an image from the image data on a display unit such that a reduced amount of noise or no noise is present in the image from the image data. After the image data is processed to reduce noise, the processed image data may be stored in a storage medium.

In exemplary embodiments, an image processing method includes extracting a first low-frequency component and a first high-frequency component from first image data. The first image data may represent an object photographed by a photographing apparatus. The method may also include applying a noise reduction filter to the first low-frequency component and the first high-frequency component to obtain a second low-frequency component and a second high-frequency component, respectively. The method may further include obtaining edge data from the second low-frequency component, and amplifying a portion of the second high-frequency component that corresponds to the edge data to obtain a third high-frequency component. Additionally, the method may include combining the second low-frequency component with the third high-frequency component to obtain second image data, and controlling the second image data representing the object photographed by the photographing apparatus to be output to at least one of a storage medium and a display unit.

Extracting the first low-frequency component and the first high-frequency component may include using at least one of a low-pass filter and a high-pass filter.

Applying the noise reduction may include applying a bilateral filter to the first low-frequency component and the first high-frequency component.

Amplifying a portion of the second high-frequency component may include amplifying substantially only the portion of the second high-frequency component that corresponds to the edge data to obtain the third high-frequency component.

Extracting the first low-frequency component and the first high-frequency component may include extracting one of the first low-frequency component and the first high-frequency component from the first image data, and extracting the other of the first low-frequency component and the first high-frequency component based on a difference between the first image data and the extracted one of the first low-frequency component and the first high-frequency component.

The method may also include photographing the object using a photographing device.

The method may also include extracting the first image data from at least one of a storage medium and an image capture device.

In exemplary embodiments, an image processing apparatus may include a low-frequency component extraction unit configured to extract a first low-frequency component from first image data, and a high-frequency component extraction unit configured to extract a first high-frequency component from the first image data. The apparatus may also include a noise reduction unit configured to apply a noise reduction filter to the first low-frequency component and the first high-frequency component to obtain a second low-frequency component and a second high-frequency component, respectively. The apparatus may further include an edge data obtaining unit configured to obtain edge data from the second low-frequency component, and a high-frequency component tuning unit configured to amplify a portion of the second high-frequency component that corresponds to the edge data to obtain a third high-frequency component. Additionally, the apparatus may include an image synthesis unit configured to combine the second low-frequency component with the third high-frequency component to obtain second image data, and an image data input/output unit configured to input the first image data from at least one of an image capture device and a storage medium, and output the second image data to at least one of a display unit and a storage medium.

The low-frequency component extraction unit may include a low-pass filter.

The high-frequency component extraction unit may include a high-pass filter.

The noise reduction unit may include a bilateral filter.

The high-frequency component tuning unit may be further configured to amplify substantially only the portion of the second high-frequency component that corresponds to the edge data to obtain the third high-frequency component.

The high-frequency component extraction unit may be further configured to extract the first high-frequency component based on a difference between the first image data and the first low-frequency component.

BRIEF DESCRIPTION OF THE DRAWINGS

The above and other features and advantages of the present invention will become more apparent by describing in detail exemplary embodiments thereof with reference to the attached drawings listed below:

FIG. 4 is a block diagram schematically illustrating an exemplary digital signal processor (DSP) of the digital photographing apparatus illustrated in FIG. 3.

FIG. 7 is a schematic flowchart of an exemplary image processing method.

DETAILED DESCRIPTION

Hereinafter, exemplary embodiments will be described in detail with reference to the appended drawings.

Figure 1:
FIG. 1 illustrates an exemplary first image containing noise.
Figure 2:
FIG. 2 illustrates an exemplary image obtained by applying a noise reduction filter to the first image of FIG. 1.

FIG. 1 illustrates an exemplary first image Im1 containing noise. In the conventional art, a bilateral filter is typically used to remove noise from an image, but resolution of a resulting image obtained by applying the bilateral filter to the image is typically degraded although noise may be reduced therein. In general, application of a noise reduction filter such as the bilateral filter may result in a level of noise in an image being approximately zero by averaging or weight-averaging data of pixels in a region having a predetermined size, based on an assumption that noise is evenly distributed. An edge may be generally understood in an image as a boundary between two subjects or a crease in a subject's clothes. A difference between a data value (e.g., brightness value) of a pixel at such an edge in an image and a data value (e.g., brightness value) of a neighboring pixel is typically greater than a difference between data values of adjacent pixels in a part of the image other than the edge. Thus if the noise reduction filter is simply applied to the image, the difference between the data values of the pixel at the edge and the neighboring pixel typically decreases, thereby lowering the resolution of the image. FIG. 2 illustrates an exemplary image NRI obtained by applying a noise reduction filter to the first image Im1 of FIG. 1. Referring to FIG. 2, the texture of the clothes (knitwear) of a woman who is a subject of the image is greatly degraded.

Thus, it is desirable to prevent damage of edge data even when the noise reduction filter is applied to the first image Im1 to reduce noise.

Figure 3:
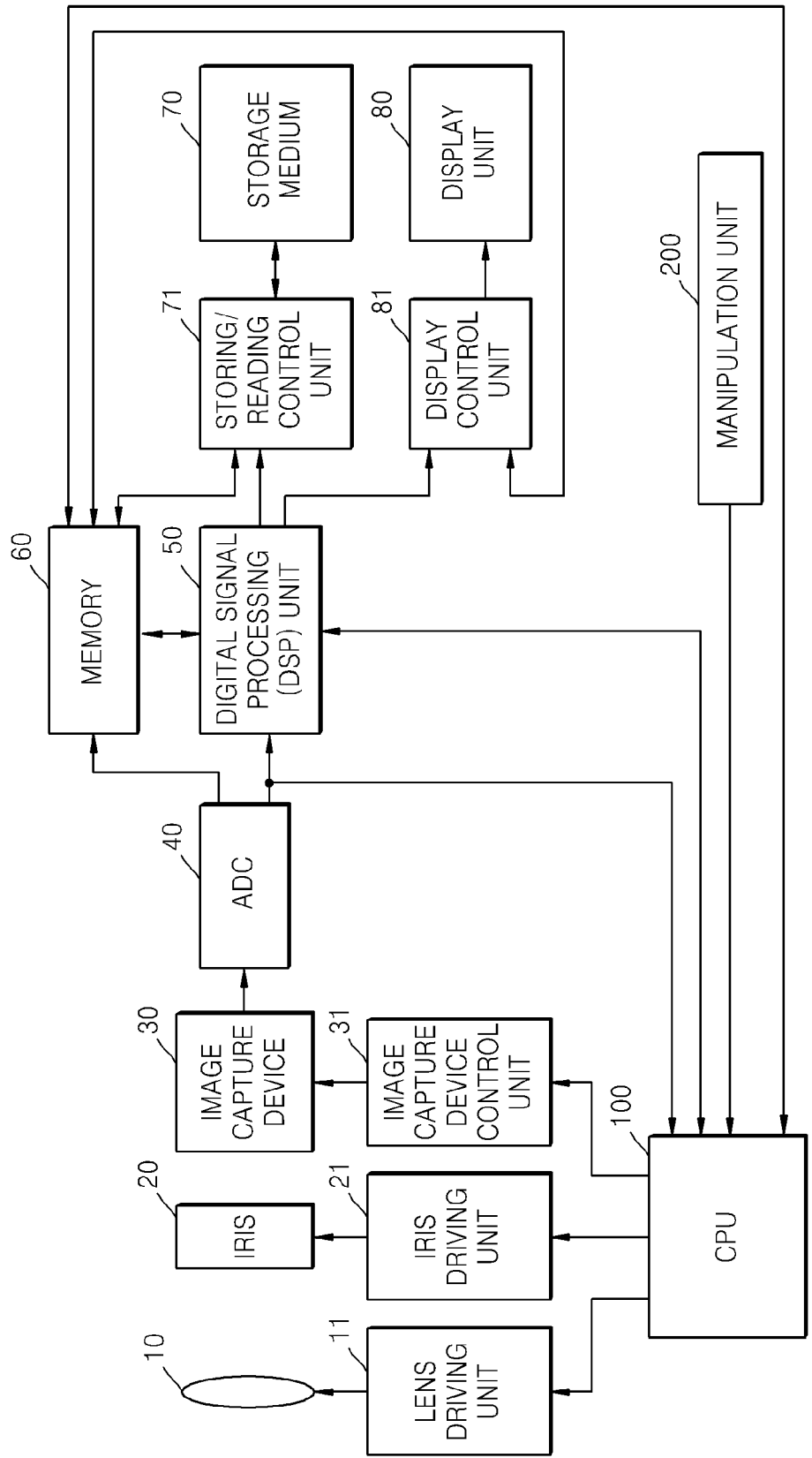
FIG. 3 is a block diagram schematically illustrating an exemplary digital photographing apparatus.

FIG. 3 is a block diagram schematically illustrating an exemplary digital photographing apparatus. FIG. 4 is a block diagram schematically illustrating an exemplary digital signal processor (DSP) 50 of the digital photographing apparatus illustrated in FIG. 3. All operations of the digital photographing apparatus may be controlled by a central processing unit (CPU) 100. The digital photographing apparatus may include a manipulation unit 200 having buttons, knobs, dials, keys, and/or the like configured to generate an electrical signal in response to a user's instruction. The electrical signal generated by the manipulation unit 200 may be transmitted to the CPU 100 so that the CPU 100 can control the digital photographing apparatus in response to the electrical signal.

In a shooting mode, if an electrical signal generated in response to a user's instructions is input to the CPU 100, the CPU 100 may analyze the electrical signal and control a lens driving unit 11, an iris driving unit 21, and an image capture device control unit 31, thus controlling a position of a lens 10, a degree of openness of an iris 20, and a sensitivity of an image capture device 30, respectively. The image capture device 30 may generate image data from light received through the lens 10 and the iris 20. The light may be reflected or originate from a subject to be photographed. An analog/digital (A/D) converter 40 may convert analog data received from the image capture device 30 into digital data. The A/D converter 40 may be omitted from the digital photographing apparatus, depending on characteristics of the image capture device 30.

Data output from the image capture device 30 and/or the A/D converter 40 may be provided to the DSP 50 via a memory 60 or directly. The data output from the image capture device 30 and/or the A/D converter 40 may also be provided to the CPU 100. The memory 60 may include a read-only memory (ROM) or a random access memory (RAM). The DSP 50 may perform digital signal processing, such as gamma correction or white balance correction, if desired.

As illustrated in FIG. 4, the DSP 50 may include a low-frequency component extraction unit 51, a high-frequency component extraction unit 52, a noise reduction unit 53, an edge data obtaining unit 55, a high-frequency component tuning unit 57, and an image synthesis unit 59. However, these elements may be installed in the digital photographing apparatus in various other arrangements. For example, these elements illustrated in FIG. 4 may be installed separately from the DSP 50 or as part of the other elements of the digital photographing apparatus, excluding the DSP 50, illustrated in FIG. 3. That is, digital photographing apparatuses according to embodiments of the present invention may be implemented in various other forms in which the low-frequency component extraction unit 51, the high-frequency component extraction unit 52, the noise reduction unit 53, the edge data obtaining unit 55, the high-frequency component tuning unit 57, and the image synthesis unit 59 are included. The operations of these elements will be described later.

Referring again to FIG. 3, data output from the DSP 50 may be transmitted to a display control unit 81 directly or via the memory 60. The display control unit 81 may control a display unit 80 in order to display an image on the display unit 80. Image data output from the DSP 50 may be input to a storing/reading control unit 71 directly or via the memory 60. The storing/reading control unit 71 may store the image data in a storage medium 70, in response to a signal received from the user or automatically. Alternatively, the storing/reading controller 71 may interpret image data of an image file stored in the storage medium 70, and provide the interpretation result to the display controller 81 via the memory 60 or via another path so that an image representing the image data of the image file may be displayed on the display unit 80. The storage medium 70 may be attachable to and detachable from the digital photographing apparatus (e.g., a flash memory card) or be fixedly built into the digital photographing apparatus (e.g., an integrated circuit or a hard drive).

Functions of the low-frequency component extraction unit 51, the high-frequency component extraction unit 52, the noise reduction unit 53, the edge data obtaining unit 55, the high-frequency component tuning unit 57, and the image synthesis unit 59 will now be described with reference to the drawings.

Figure 5A:
FIG. 5A illustrates an exemplary image including a first low-frequency component extracted from the first image in FIG. 1 by a low-frequency component extraction unit.

First, the low-frequency component extraction unit 51 may extract a first low-frequency component from first image data corresponding to a first image as illustrated in FIG. 1. To this end, the low-frequency component extraction unit 51 may use a low-pass filter. Alternatively, a high-frequency component may be extracted from the first image data by using a high-pass filter and a first low-frequency component may be obtained based on a difference between the first image data and the high-frequency component. FIG. 5A illustrates an exemplary image LI including the first low-frequency component extracted from the first image Im1 in FIG. 1 by the low-frequency component extraction unit 51. As illustrated in FIG. 5A, edges (e.g., an outline of an object, texture of the clothing, etc.) in the image LI including the first low-frequency component are less clear than in the first image of FIG. 1, and thus, the overall resolution of the image is degraded. However, the first low-frequency component includes most of the data relevant to color and brightness among the first image data corresponding to the first image Im1 in FIG. 1 relating to color and brightness.

Figure 5B:
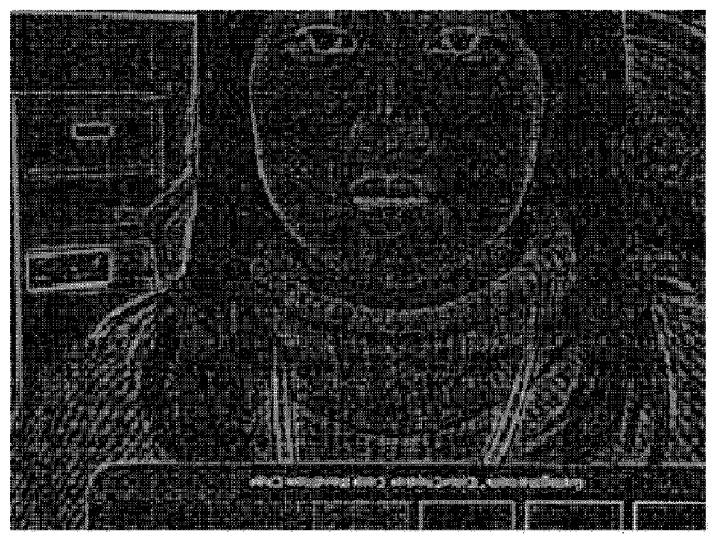
FIG. 5B illustrates an exemplary image including a first high-frequency component extracted from the first image in FIG. 1 by a high-frequency component extraction unit.

The high-frequency component extraction unit 52 may extract a first high-frequency component from the first image data corresponding to the first image Im1 as illustrated in FIG. 1. To this end, the high-frequency component extraction unit 52 may use a high-pass filter. Alternatively, a low-frequency component may be extracted from the first image data by using a low-pass filter and a first high-frequency component may be obtained based on a difference between the first image data and the low-frequency component. FIG. 5B illustrates an exemplary image HI including the first high-frequency component extracted from the first image Im1 in FIG. 1 by the high-frequency component extraction unit 52. As illustrated in FIG. 5B, the image HI including the first high-frequency component includes most of the edges (e.g., an outline of an object, texture of the clothing, etc.) of the first image Im1 in FIG. 1.

To produce a high quality output noise-reduced image, noise should be effectively removed from the first low-frequency component and the first high-frequency component, as will be described with reference to FIGS. 6A through 6C, which are conceptual graphs of the first image data, the first low-frequency component, and the first high-frequency component.

Figure 6A:
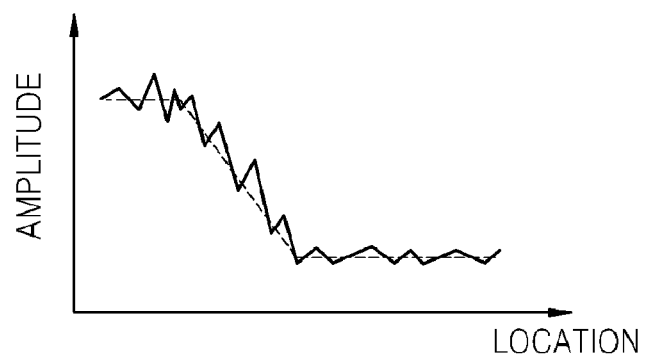
FIG. 6A is a conceptual graph of the components of exemplary first image data.
Figure 6B:
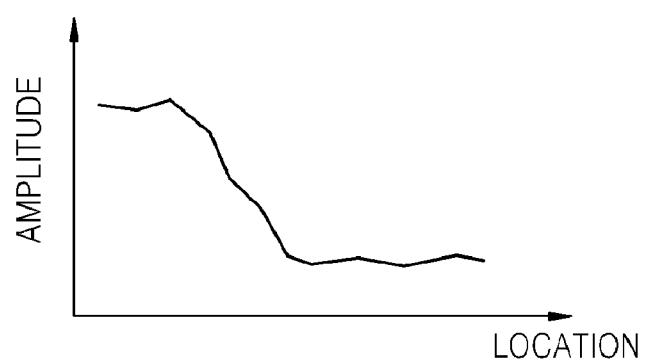
FIG. 6B is a conceptual graph of a first low-frequency component extracted from the first image data of FIG. 6A.
Figure 6C:
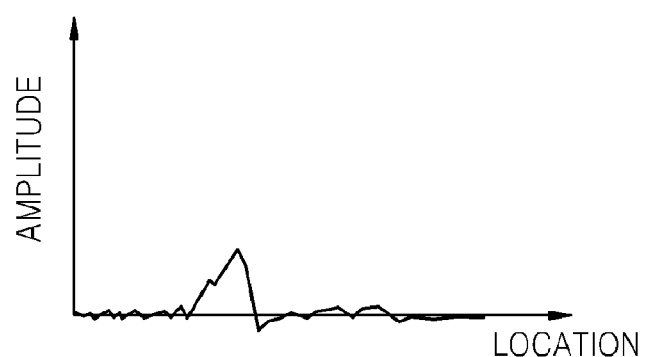
FIG. 6C is a conceptual graph of a first high-frequency component extracted from the first image data of FIG. 6A.

FIG. 6A is a conceptual graph of the components of the exemplary first image data. FIG. 6B is a conceptual graph of the first low-frequency component extracted from the first image data of FIG. 6A. FIG. 6C is a conceptual graph of the first high-frequency component extracted from the first image data of FIG. 6A. In FIG. 6A, ideal, noise-free first image data is denoted by dotted lines, and first image data including noise is denoted by solid lines. As illustrated in FIGS. 6B and 6C, the first low-frequency component extracted from the first image data by the low-frequency component extraction unit 51 and the first high-frequency component extracted from the first image data by the high-frequency component extraction unit 52 include noise.

Figure 6D:
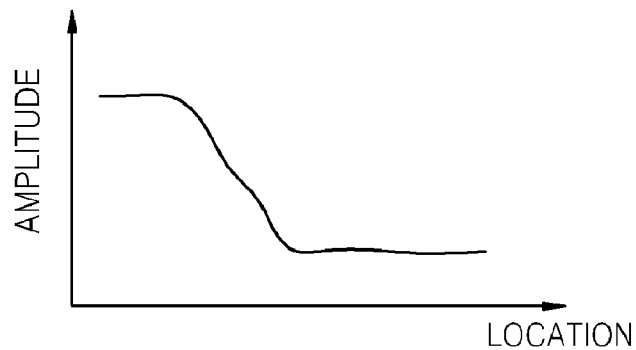
FIG. 6D is a conceptual graph of a second low-frequency component obtained by removing noise from the first low-frequency component of FIG. 6B.
Figure 6E:
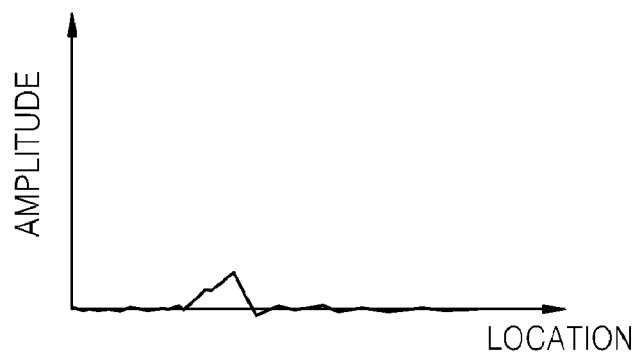
FIG. 6E is a conceptual graph of a second high-frequency component obtained by removing noise from the first high-frequency component of FIG. 6C.

The noise reduction unit 53 may apply a noise reduction filter to the first low-frequency component extracted by the low-frequency component extraction unit 51 and to the first high-frequency component extracted by the high-frequency component extraction unit 52 to obtain a second low-frequency component and a second high-frequency component, respectively. FIG. 6D is a conceptual graph of the second low-frequency component obtained by removing noise from the first low-frequency component of FIG. 6B. FIG. 6E is a conceptual graph of the second high-frequency component obtained by removing noise from the first high-frequency component of FIG. 6C. Comparing FIGS. 6D and 6E with FIGS. 6B and 6C, variations in amplitude in FIGS. 6D and 6E are smaller than variations in amplitude in FIGS. 6B and 6C. This can be understood due to loss of data, specifically, edge data, as a result of reducing noise. The noise reduction unit 53 may use, for example, a bilateral filter. However, when simply combining the second low-frequency component and the second high-frequency component, a noise reduction filter, such as the bilateral filter, may result in noise being approximately zero by averaging or weight-averaging data of pixels in a region having a predetermined size, based on the assumption that noise is evenly distributed. As a result, resolution of the image may be degraded.

Figure 6F:
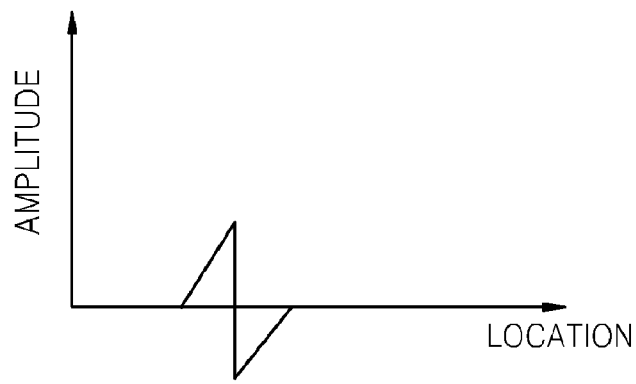
FIG. 6F is a conceptual graph of the edge data extracted from the second low-frequency component of FIG. 6D.
Figure 6G:
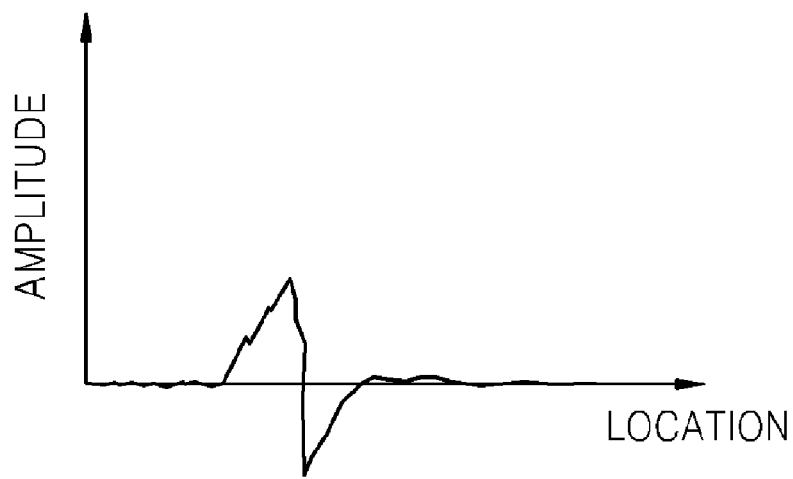
FIG. 6G is a conceptual graph of a third high-frequency component obtained by tuning the second high-frequency component of FIG. 6E using the edge data of FIG. 6F.

To reduce noise while avoiding the degradation of the resolution of the image described above with reference to FIGS. 6D and 6E, in the digital photographing apparatus according to the current embodiment of the present invention, the edge data obtaining unit 55 may obtain edge data from the second low-frequency component obtained by the noise reduction unit 53. FIG. 6F is a conceptual graph of the edge data extracted from the second low-frequency component of FIG. 6D by the edge data obtaining unit 55. Then, the high-frequency component tuning unit 57 may amplify a portion of the second high-frequency component that corresponds to the edge data obtained by the edge data obtaining unit 55 to obtain a third high-frequency component. In particular, the high-frequency component tuning unit 57 may amplify substantially only the portion of the second high-frequency component that corresponds to the edge data obtained by the edge data obtaining unit 55 to obtain the third high-frequency component. FIG. 6G is a conceptual graph of the third high-frequency component obtained by the high-frequency component tuning unit 57 tuning the second high-frequency component of FIG. 6E using the edge data of FIG. 6F. Referring to FIG. 6G, in comparison with FIG. 6E, the amplitude of substantially only the portion of the second high-frequency component that corresponds to the edge data obtained by the edge data obtaining unit 55 is amplified.

Figure 6H:
FIG. 6H is a conceptual graph of second image data obtained by combining the second low-frequency component of FIG. 6D and the third high-frequency component of FIG. 6G.

The image synthesis unit 59 may combine the second low-frequency component obtained by the noise reduction unit 55 and the third low-frequency component obtained by the high-frequency component tuning unit 57 to obtain second image data corresponding to a second image. The second image may have reduced noise in comparison with the first image. FIG. 6H is a conceptual graph of the second image data obtained by combining the second low-frequency component of FIG. 6D and the third high-frequency component of FIG. 6G. Comparing FIG. 6H with FIG. 6A, the second image data in FIG. 6H is more similar to the ideal first image data denoted with dotted lines in FIG. 6A.

Typically, most of the data on the edges belong to the high-frequency component. Thus, it is possible to make edges in the final second image look clear by tuning the high-frequency component. In particular, when the high-frequency component tuning unit 57 obtains the third high-frequency component by amplifying the portion of the second high-frequency component that corresponds to the edge data obtained by the edge data obtaining unit 55, substantially only data on the edges, excluding noise, may be amplified. Thus, noise can be reduced and the edges may look clear in the final second image.

An image processing apparatus according to the current embodiment may include a digital photographing apparatus as illustrated in FIG. 3, and thus may be capable of processing image data obtained through photographing, and storing in the storage medium 70 image data corresponding to an image in which noise is reduced. However, the present invention is not limited thereto and the present invention may also be applied to other types of image processing apparatuses, such as a personal digital assistant (PDA) and a personal multimedia player (PMP).

FIG. 7 is a schematic flowchart of an exemplary image processing method. In the exemplary image processing method, initially, a first low-frequency component and a first high-frequency component may be extracted from first image data (operation S10). In operation S10, at least one of a low-pass filter and a high-pass filter may be used. For example, the low-pass filter may be used to extract the first low-frequency component, and then a difference between the first image data and the first low-frequency component may be used to extract the first high-frequency component. Alternatively, the high-pass filter may be used to extract the first high-frequency component, and then a difference between the first image data and the first high-frequency component may be used to extract the first low-frequency component. Operation S10 may be implemented in various manners as to the one described above. FIG. 6A is a conceptual graph of the components of exemplary first image data, and FIGS. 6B and 6C are conceptual graphs of the first low-frequency component and the first high-frequency component extracted from the first image data of FIG. 6A, respectively.

Then, a second low-frequency component and a second high-frequency component may be obtained by applying a noise reduction filter respectively to the first low-frequency component and the first high-frequency component (operation S20). To this end, for example, a bilateral filter may be used. FIGS. 6D and 6E are conceptual graphs of the second low-frequency component and the second high-frequency component, respectively, obtained by removing noise from the first low-frequency component of FIG. 6B and the first high-frequency component of FIG. 6C. Comparing FIGS. 6D and 6E with FIGS. 6B and 6C, variations in amplitude in the second low-frequency and high-frequency components in FIGS. 6D and 6E are smaller than variations in amplitude in the first low-frequency and high-frequency components in FIGS. 6B and 6C. Edge data, as shown in FIG. 6F, may then be obtained from the second low-frequency component (operation S30).

Then, a third high-frequency component may be obtained by amplifying a portion of the second high-frequency component that corresponds to the edge data (operation S40). In particular, the third high-frequency component may be obtained by amplifying substantially only the portion of the second high-frequency component that corresponds to the edge data. FIG. 6G is a conceptual graph of the third high-frequency component obtained in operation S40. FIG. 6G in comparison with FIG. 6E illustrates that the amplitude of substantially only the portion of the second high-frequency component that corresponds to the edge is amplified.

Finally, second image data may be obtained by combining the second low-frequency component and the third high-frequency component (operation S50). FIG. 6H is a conceptual graph of the second image data obtained by combining the second low-frequency component of FIG. 6D and the third high-frequency component of FIG. 6G. In comparison with FIG. 6A, the second image data in FIG. 6H is more similar to the ideal first image data denoted with dotted lines than the first image data denoted with solid lines in FIG. 6A.

Most of the data on the edges typically belong to the high-frequency component. Thus, it is possible to make edges in the final second image look clear by tuning the high-frequency component. In particular, in operation S40 of tuning the second high-frequency component, the third high-frequency component is obtained by amplifying the portion of the second high-frequency component that corresponds to the edge data. In other words, substantially only data on the edges, excluding noise, may be amplified in operation S40. Thus, noise can be reduced and the edges may look clear in the final second image.

According to an image processing method and apparatus as described above, noise in an image may be effectively reduced.

Functional programs, codes, and code segments for accomplishing the present invention can be easily construed by programmers of ordinary skill in the art to which the present invention pertains. Embodiments of the present invention may be implemented as one or more software modules. These software modules may be stored as program instructions executable by a processor on a computer-readable storage medium, where the program instructions stored on this medium can be read by a computer, stored in a memory, and executed by the processor. For example, the software modules may include computer-readable code constructed to perform the operations included in a method according to the present invention when this code is read from the computer-readable storage medium via the DSP 50 and/or the CPU 100 of FIG. 1. The recording medium may be embodied as the storage medium 70 or the memory 60 of FIG. 3, or a separate recording medium. Examples of the storage medium include magnetic storage media (e.g., floppy disks, hard disks, or magnetic tape), optical storage media (e.g., CD-ROMs or digital versatile disks (DVDs)), and electronic storage media (e.g., integrated circuits (IC's), ROM, RAM, EEPROM, or flash memory). The storage medium may also be distributed over network-coupled computer systems so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. An image processing method comprising:
   extracting a first low-frequency component and a first high-frequency component from first image data;
   applying a noise reduction filter to the first low-frequency component and to the first high-frequency component to obtain a second low-frequency component and a second high-frequency component, respectively;
   obtaining edge data from the second low-frequency component;
   amplifying a portion of the second high-frequency component that corresponds to the edge data to obtain a third high-frequency component; and
   combining the second low-frequency component with the third high-frequency component to obtain second image data.

2. The method of claim 1, wherein extracting the first low-frequency component and the first high-frequency component comprises using at least one of a low-pass filter and a high-pass filter.

3. The method of claim 1, wherein applying the noise reduction comprises applying a bilateral filter to the first low-frequency component and to the first high-frequency component.

4. The method of claim 1, wherein amplifying a portion of the second high-frequency component comprises amplifying substantially only the portion of the second high-frequency component that corresponds to the edge data to obtain the third high-frequency component.

5. The method of claim 1, wherein extracting the first low-frequency component and the first high-frequency component comprises:
   extracting one of the first low-frequency component and the first high-frequency component from the first image data; and
   extracting the other of the first low-frequency component and the first high-frequency component based on a difference between the first image data and the extracted one of the first low-frequency component and the first high-frequency component.

6. The method of claim 1, further comprising photographing the object using the photographing apparatus.

7. The method of claim 1, further comprising extracting the first image data from at least one of a storage medium and an image capture device.

8. The method of claim 1, further comprising outputting the second image data to at least one of a storage medium and a display unit.

9. An image processing apparatus comprising:
   a low-frequency component extraction unit configured to extract a first low-frequency component from first image data;
   a high-frequency component extraction unit configured to extract a first high-frequency component from the first image data;
   a noise reduction unit configured to apply a noise reduction filter to the first low-frequency component and the first high-frequency component to obtain a second low-frequency component and a second high-frequency component, respectively;
   an edge data obtaining unit configured to obtain edge data from the second low-frequency component;
   a high-frequency component tuning unit configured to amplify a portion of the second high-frequency component that corresponds to the edge data to obtain a third high-frequency component; and
   an image synthesis unit configured to combine the second low-frequency component with the third high-frequency component to obtain second image data.

10. The apparatus of claim 9, wherein the low-frequency component extraction unit comprises a low-pass filter.

11. The apparatus of claim 9, wherein the high-frequency component extraction unit comprises a high-pass filter.

12. The apparatus of claim 9, wherein the noise reduction unit comprises a bilateral filter.

13. The apparatus of claim 9, wherein the high-frequency component tuning unit is further configured to amplify substantially only the portion of the second high-frequency component that corresponds to the edge data to obtain the third high-frequency component.

14. The apparatus of claim 9, wherein the high-frequency component extraction unit is further configured to extract the first high-frequency component based on a difference between the first image data and the first low-frequency component.

15. The apparatus of claim 9, further comprising an image data input/output unit configured to input the first image data from at least one of an image capture device and a storage medium and output the second image data to at least one of a display unit and a storage medium.

16. A computer-readable storage medium having stored thereon a program, the program being executable by a processor to perform an image processing method, the method comprising:

extracting a first low-frequency component and a first high-frequency component from first image data, the first image data representing an object photographed by a photographing apparatus;

applying a noise reduction filter to the first low-frequency component and to the first high-frequency component to obtain a second low-frequency component and a second high-frequency component, respectively;

obtaining edge data from the second low-frequency component;

amplifying a portion of the second high-frequency component that corresponds to the edge data to obtain a third high-frequency component;

combining the second low-frequency component with the third high-frequency component to obtain second image data; and controlling the second image data representing the object photographed by a photographing apparatus to be output to at least one of a storage medium and a display unit.

17. The storage medium of claim 16, wherein extracting the first low-frequency component and the first high-frequency component comprises using at least one of a low-pass filter and a high-pass filter.

18. The storage medium of claim 16, wherein applying the noise reduction filter to obtain the second low-frequency component and the second high-frequency component comprises using a bilateral filter.

19. The storage medium of claim 16, wherein amplifying a portion of the second high-frequency component comprises amplifying substantially only the portion of the second high-frequency component that corresponds to the edge data to obtain the third high-frequency component.

20. The storage medium of claim 16, wherein extracting the first low-frequency component and the first high-frequency component comprises:

extracting one of the first low-frequency component and the first high-frequency component from the first image data; and extracting the other of the first low-frequency component and the first high-frequency component based on a difference between the first image data and the extracted one of the first low-frequency component and the first high-frequency component.

* * * * *